United States Patent [19]

Pareja

[11] Patent Number: 4,498,372
[45] Date of Patent: Feb. 12, 1985

[54] PUMP WITH RING RETAINED FLOATING WRIST PINS AND CONNECTING RODS

[75] Inventor: Ramon Pareja, Edina, Minn.

[73] Assignee: Lear Siegler, Inc., Santa Monica, Calif.

[21] Appl. No.: 564,727

[22] Filed: Dec. 23, 1983

[51] Int. Cl.³ ............... F16J 1/14; F04B 1/04; F04B 39/14
[52] U.S. Cl. ............... 92/187; 417/273; 417/534; 92/129
[58] Field of Search ............... 74/60; 417/273, 534; 92/257, 129, 187

[56] References Cited

U.S. PATENT DOCUMENTS

| | | | |
|---|---|---|---|
| 3,018,737 | 1/1962 | Cook et al. | 74/60 |
| 3,367,277 | 2/1968 | Andrews et al. | 92/257 |
| 4,381,179 | 4/1983 | Pareja | 417/539 |

Primary Examiner—William L. Freeh
Attorney, Agent, or Firm—Orrin M. Haugen; Thomas J. Nikolai; Douglas L. Tschida

[57] ABSTRACT

Improved multi-cylinder pumps wherein a plurality of co-planar positioned connecting rods are radially disposed about a crankshaft and wherein a plurality of generally cylindrical spool-like wrist pins are rotatively coupled to the connecting rods. The improvement comprises an assembly wherein the wrist pins have opposed end regions bordering a smaller diameter central region that contains one or more ring receiving grooves and which wrist pins are mountable in overlapping relation to retainer ring containing grooves formed in the connecting rods. Upon mounting retainer rings in the connecting rod grooves and inserting and rotatively locking the wrist pins in the connecting rods, the connecting rods, wrist pins and retainer rings are integrally locked together in radially extending relation.

8 Claims, 8 Drawing Figures

PUMP WITH RING RETAINED FLOATING WRIST PINS AND CONNECTING RODS

BACKGROUND OF THE INVENTION

The present invention relates to fluid handling pumps with floating wrist pins and, in particular, to an improved construction thereof for simplfying the assembly of a number of planar-mounted, radially displaced connecting rods relative to the pump's crankshaft and wherein each connecting rod contains a floating wrist pin.

Fluid handling pumps of the present type, generally operate in a push-pull fashion relative to an eccentric lobe contained on the pump's crankshaft. Each eccentric thus drives the piston or diaphragm assemblies of one or more cylinders to and fro and which assemblies radiate from the eccentric. Each piston or diaphragm assembly, in turn, comprises a connecting rod, a floating wrist pin, a push rod for threadable mounting in the wrist pin and the piston or diaphragm head itself. A previous patent, U.S. Pat. No. 4,381,179 assigned to the present assignee, Lear Siegler, Inc., issuing on Apr. 26, 1983 and entitled "Pumps with Floating Wrist Pins" generally describes the construction of pumps of these types and their use of floating wrist pins. Also disclosed therein is the retention of a number of connecting rods to the pump's crankshaft via a pair of circumferentially positioned retainer rings. This feature further being exhibited in pumps such as manufactured by Annovi Reverebi S.p.A.

While the above patent sets forth a greatly improved and more easily assembled construction, it has become apparent that the assembly may be improved so as to further facilitate the assembly and maintenance thereof. It is in this regard that the present invention is directed and wherein the construction of the floating wrist pin and connecting rod have been modified so as to provide for the mounting of a number of connecting rods about a pair of retainer rings and the retention of the connecting rods thereto upon inserting and locking the wrist pins to the connecting rods.

The various objects, advantages and distinctions of the present improved invention will, however, become more apparent upon referring to the following description thereof. Before referring thereto, though, it is to be recognized that the present invention is described with respect to its presently preferred embodiment only and that, accordingly, still other modifications may be made thereto without departing from the spirit and scope thereof.

SUMMARY OF THE INVENTION

An improved multi-cylinder liquid handling pump, wherein the improvement comprises an interlocked planar assembly of a plurality of connecting rods and associated wrist pins. Depending upon the number and placement of the cylinders being driven by a pump's crankshaft eccentric, each connecting rod contains an arcuate major lateral surface of an appropriate arc length that together in assembly substantially circumscribe the crankshaft eccentric with which the major lateral surfaces are intended to cooperate. Each connecting rod further includes an arcuate groove in both its front and its back face, the grooves being concentric with the major arcuate lateral surface, whereby a pair of retainer rings placed in each connecting rod's grooves contain the connecting rods thereabout in a radially displaced fashion. Upon insertion of the floating wrist pin in each connecting rod in a bore containing an arcuate minor lateral surface, opposed to the major lateral surface, radial shoulders on the wrist pin partially overlap and lock the retainer rings in place in the grooves formed in the faces of the connecting rod and thereby form an integral assembly.

Each wrist pin is of a generally cylindrical spool-like shape, having a pair of opposed cylindrical end portions of larger diameter than a central cylindrical portion. The central cylindrical portion contains a pair of annular grooves adjacent to the end portions that are adapted to mate with the retainer rings. Each wrist pin also has a flat lateral surface containing a threaded radial bore for mounting to an associated push rod.

Assembly is achieved by circularly arranging the connecting rods about the retainer rings and inserting the retainer rings in the facial grooves of the connecting rods. Upon inserting each wrist pin in the minor arcuate bore of its mating connecting rod, fitting the retainer rings in the annular grooves of the wrist pin and rotating the wrist pin, the wrist pins are locked in the connecting rods and, simultaneously, the retainer rings are locked to the connecting rods.

BRIEF DESCRIPTION OF THE DRAWINGS

FIGS. 1a and 1b show respective front and side views of the present wrist pins.

FIGS. 1c and 1d show respective front and top views of the present connecting rods.

DESCRIPTION OF THE PREFERRED EMBODIMENT

Figure 1:
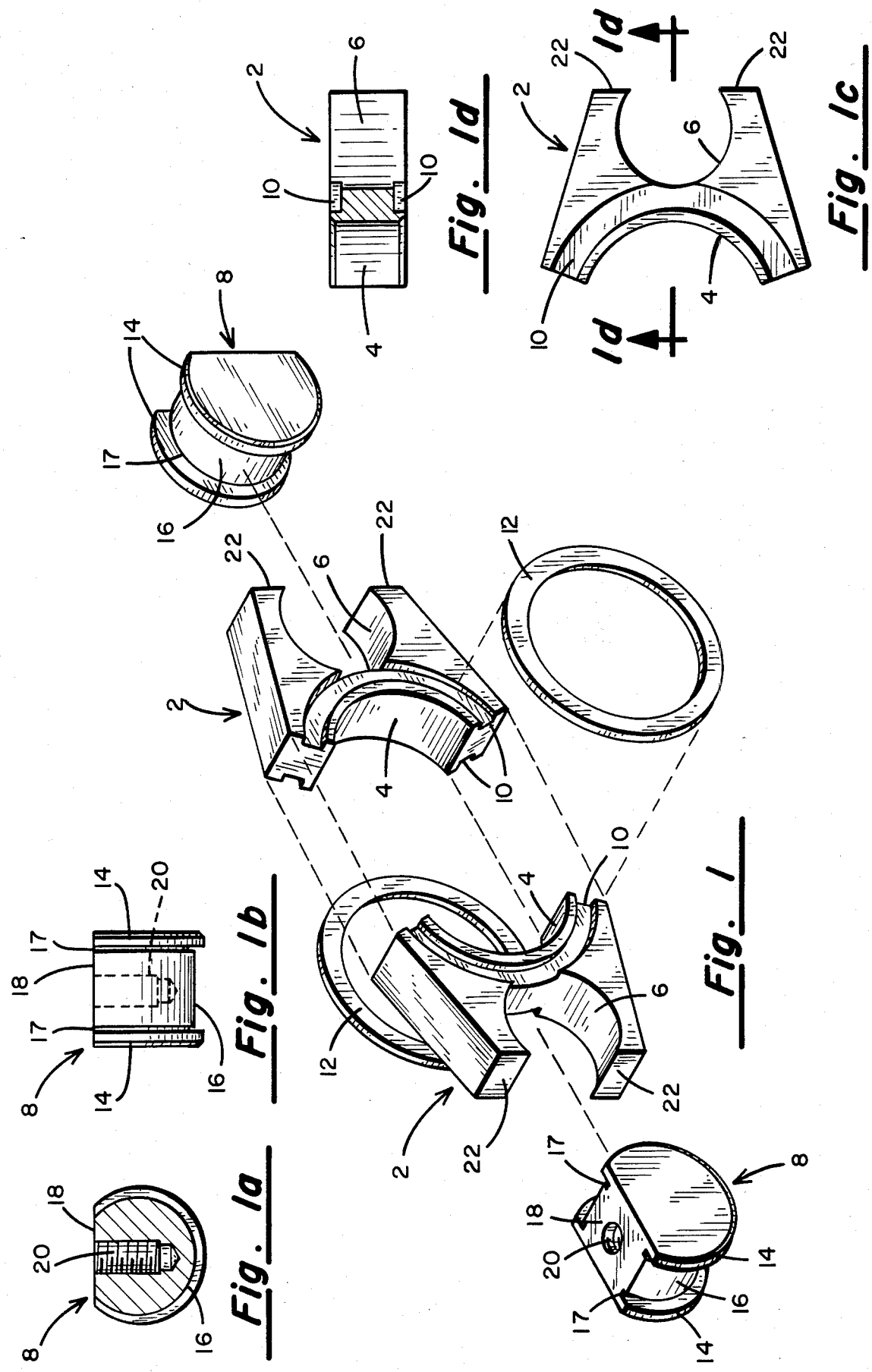
FIG. 1 shows an exploded assembly view of the present invention.

Referring to FIG. 1, an exploded assembly view is shown of the connecting rod/wrist pin assembly of the present invention. Generally, and for the two cylinder version shown, it comprises a pair of connecting rods 2 that each contain a pair of major and minor arcuate lateral surfaces 4 and 6 formed in opposite ends thereof. The radius of the major surface 4 is bored slightly larger than the radius of an eccentric lobe (not shown) contained on the pump's crankshaft, while the smaller arcuate surface 6 is bored to circumscribe more that 180° and thereby accommodate the insertion of a floating wrist pin 8 therein. The opposed front and back faces of the connecting rods 2 each contain formed annular grooves 10 that are concentric with the major arcuate surfaces 4. The depth of the grooves 10 correspond to the thickness of a pair of toroidal retainer rings 12, such that upon inserting the rings 12 into the ring receiving grooves 10, the outer surfaces of the retainer rings 12 set flush with the front and back faces of the connecting rods 2. Further details of the construction of the connecting rods 2 can, however, be seen upon directing attention to FIGS. 1c and 1d and wherein a front and cross-sectioned top view more clearly depict the faces 4 and 6 and the grooves 10. Before continuing, too, it is to be recognized that while the following description discloses a two cylinder assembly, by appropriately reducing the major arc length of the connecting rods 2, more connecting rods 2 can be radially mounted relative to one another about the retainer rings 12.

Returning attention to FIG. 1, the floating wrist pins 8 are fabricated as an integral spool-like structure having a pair of opposed outer cylindrical flanges or regions 14 that border a central cylindrical region 16 of slightly smaller diameter. Formed into the central cylindrical region 16 adjacent to each of the outer end flanges 14 are a pair of annular grooves 17 of a width slightly greater than the thickness of the retainer rings 12. While each floating wrist pin 8 is generally circular in cross-section, a flat 18 is also milled into a portion of the lateral periphery of each. A centrally placed push rod receiving threaded bore 20 is also drilled radially therein. Further details as to the construction of the wrist pins 8 can however be seen upon directing attention to the front and side views thereof in FIGS. 1a and 1b.

Figure 2:
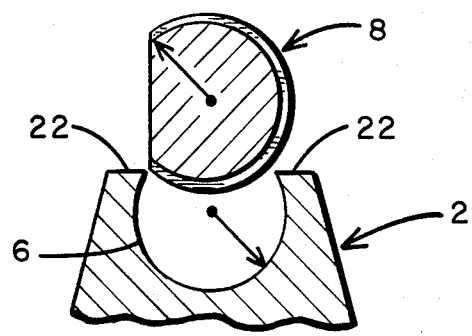
FIG. 2 shows an assembly view of the present wrist pins relative to the connecting rods.

To insert the wrist pins 8 into the bores containing the minor lateral surfaces 6, the wrist pins 8 are rotated so as to present the region of narrowest diameter to the mouth of the bore, such as shown in the lower left portion of FIG. 1. In this regard, attention is also directed to the assembly view of FIG. 2. The wrist pin 8 is then inserted into the bore containing the minor surface 6, until the end cylindrical regions 14 overlap the outer front and back surfaces of the connecting rod 2, and the retainer rings 12 are contained in the annular grooves 17. The wrist pin 8 is then rotated so as to bring the push rod bore 20 parallel to the flat end edges 22 of the connecting rod 2 (i.e. align the reference arrows). Because the retainer rings 12 set flush with the outer faces of the connecting rod 2, the retainer rings 12 are contained by engagement with the overlapping outer end regions 14 and by the grooves 17. Thus, upon assembly, a number of connecting rods 2 and wrist pins 8 may be mounted about and locked to the retainer rings 12. This assembly may then be slipped over the crankshaft and associated eccentric lobe.

Figure 3:
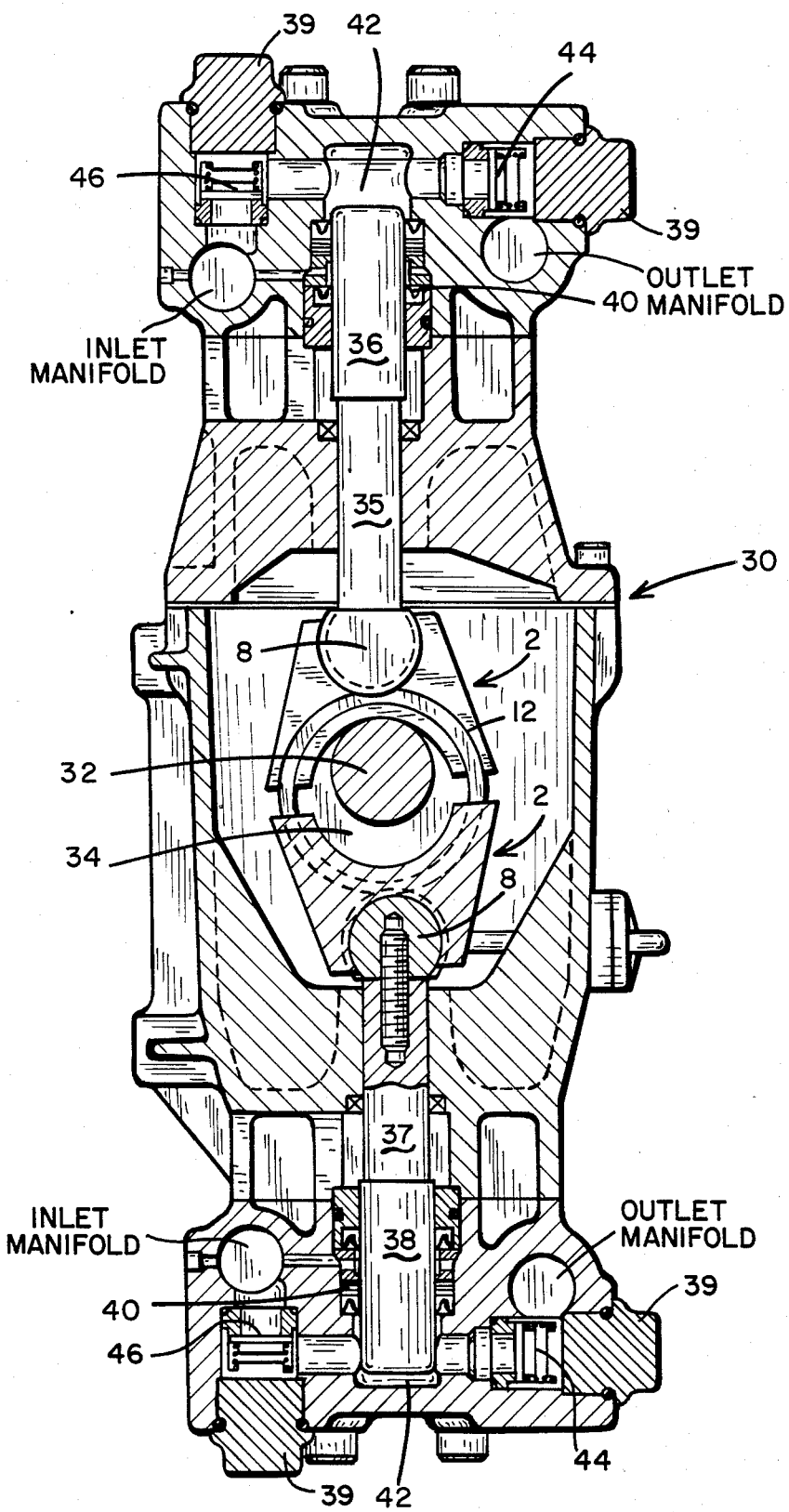
FIG. 3 shows a representative two cylinder piston pump employing the present improved connecting rod/wrist pin assembly.

In the latter regard, attention is now directed to FIG. 3 and wherein a cross-sectional view is shown through a typical two cylinder, in-line piston-type pump 30 containing the present improved assembly. Specifically, the retained connecting rod/wrist pin assembly is shown relative to the eccentric 32 of crankshaft 34, with the upper push rod 35 and piston 36 shown in their suction stroke and the lower push rod 37 and piston 38 shown in their pump stroke. Mounted at the upper end of the pistons 36 and 38 are piston seal assemblies 40 and fluid chambers 42. Opening to the fluid chambers 42 are one-way valves 44 and 46 and which act to let fluid into the chambers 42 from an inlet manifold during the suction stroke and expel the fluid to an outlet manifold during the pump stroke. Plugs 39 permit access to the valves 44 and 46. From FIG. 3 it is to be noted, too, that the particulars of the threaded mounting of the push rod 37 to the lower wrist pin 8 is shown in cross-sectioned detail.

Figure 4:
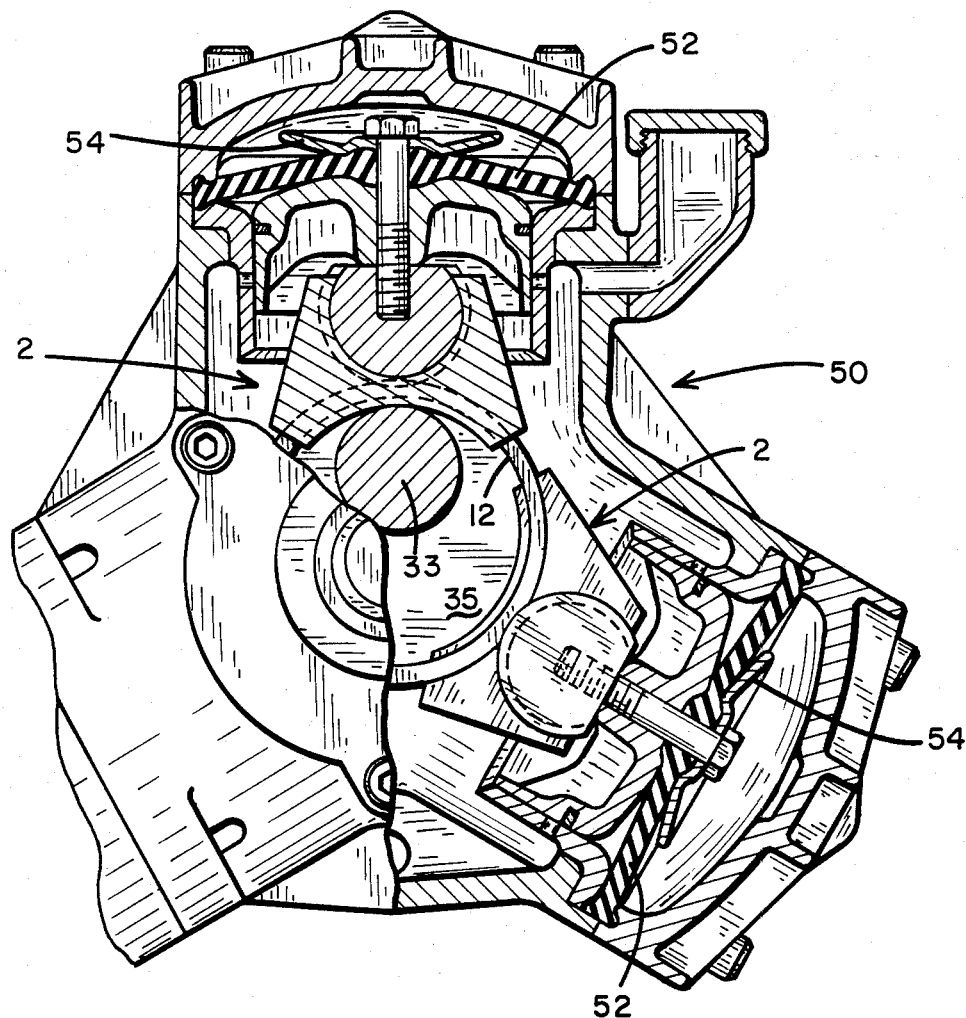
FIG. 4 shows the use of the present invention in a representative three cylinder diaphragm pump.

While the pump 30 of FIG. 3 depicts a two cylinder, push-pull, in-line piston pump arrangement, FIG. 4 depicts the present invention as applied in a multi-cylinder radial diaphragm pump 50. The principal differences between the pumps of FIGS. 3 and 4 lies in the relative sizes of the connecting rods 2. Since the major arcuate surfaces 4 of the connecting rods 2 of FIG. 4 have been foreshortened, three connecting rods 2, instead of two, can be mounted about and locked together by the retainer rings 12 and be fit about the eccentric lobe 33 on crankshaft 35.

A further distinction lies in the pump 50's use of flexible diaphragms 52, each mounted beneath an upper support 54, in lieu of the pistons 36 and 38 of FIG. 3. Otherwise, the connecting rod/wrist pin assembly of each pump is the same as previously described with respect to FIG. 1.

From the foregoing and in contrast to U.S. Pat. No. 4,381,179, it should thus be apparent that the present assembly is much more easily assembled, since now the multiple connecting rods 2 and wrist pins 8 are constrained by the rings 12 in a unitary structure, rather than requiring the assembler to piecemeal mount and support all of the connecting rod/wrist pin assemblies about the crankshaft 34, before individually mounting the retaining rings in the fashion of my previous patent and those pumps of Annovi Reverebi S.p.A.

While the present invention has been described with respect to its presently preferred embodiment and various configurations thereof in different multi-cylinder pumps, it is to be recognized that it may still further be adapted to pumps of more or less cylinders. Accordingly, it is contemplated that the following claims should be interpreted so as to include all such equivalent embodiments within the spirit and scope thereof.

What is claimed is:

1. An improved fluid handling pump of the type having a crankshaft with at least one eccentric lobe and relative to which a push rod is mounted for reciprocal movement in a cylinder, the improvement comprising:

a connecting rod having a major arcuate lateral surface formed in one end thereof for mounting about said crankshaft eccentric and a second smaller arcuate lateral surface extending inwardly from the other end thereof and circumscribing an arc of greater than 180° and including a pair of arcuate grooves formed in opposed front and back surfaces of said connecting rod, said arcuate grooves being concentric with said major arcuate surface;

a cylindrical wrist pin having first and second outer opposed cylindrical end regions of slightly greater diameter than a centrally disposed cylindrical region therebetween, said cylindrical wrist pin having a flat area defining a zone of narrow lateral dimension; and first and second retainer rings mountable in said arcuate grooves of said connecting rod, such that upon inserting the zone of said wrist pin of narrowest lateral dimension in the bore containing said second surface and rotating said wrist pin, said first and second outer cylindrical end portions hold said retainer rings in said arcuate grooves, while said central cylindrical region holds said wrist pin adjacent to said smaller arcuate lateral surface of said connecting rod.

2. Apparatus as set forth in claim 1 wherein said central region of said wrist pin includes first and second annular grooves adjacent to said first and second outer cylindrical end portions such that upon inserting and rotating said wrist pin in said connecting rod, said retainer rings are contained not only by said first and second outer regions, but also by said grooves of said central region.

3. Apparatus as set forth in claim 1 wherein the flat lateral surface of said wrist pin is threadably bored for receiving a push rod, said push rod thereby being movable in a reciprocal fashion relative to a cylinder bored in the pump.

4. Apparatus as set forth in claim 3 wherein said push rod includes a plunger head mounted to said push rod in sealed relation to a crank case containing said crankshaft and whereby liquids may be drawn in and expelled via inlet and outlet ports of said pump.

5. Apparatus as set forth in claim 3 wherein said push rod is coupled to a flexible diaphragm, the peripheral edges of which are fixedly mounted, such that the reciprocal movement of said push rod causes the alternate suction and pumping of liquid from a pump chamber containing said diaphragm.

6. An improved fluid handling pump of the type having an eccentric containing crankshaft and relative to which a push rod is mounted for reciprocal movement in a cylinder, the improvement comprising:

a connecting rod having a major arcuate lateral surface for mounting about said crankshaft eccentric and a smaller minor arcuate lateral surface circumscribing an arc of greater than 180° and including a pair of arcuate grooves let into a front and back surfaces of said connecting rod and circumferentially paralleling said major arcuate surface;

a cylindrical wrist pin having first and second outer cylindrical regions of slightly greater diameter than a centrally disposed cylindrical region therebetween and including a pair of circumferentially formed grooves in the lateral surface of said central cylindrical region adjacent to said first and second outer cylindrical regions; and first and second retainer rings mountable in said grooves of said connecting rod, such that upon inserting the portion of said wrist pin of narrowest lateral dimension in the bore containing said minor lateral surface and rotating said wrist pin, said first and second outer cylindrical regions and the grooves of said central region contain said retainer rings.

7. An improved fluid handling pump of the type having a crankshaft with at least one eccentric lobe and a push rod operatively coupled to said eccentric lobe for reciprocal movement within a cylinder, the improvement comprising:

(a) at least one single piece connecting rod means of a predetermined thickness dimension for coupling to said eccentric lobe and having a first generally circular bore passing through said thickness dimension, the center of said bore being inwardly offset from one end edge of said connecting rod means by a distance less than the radius of said generally circular bore to define a first recess having an arcuate lateral surface corresponding to the surface of said eccentric lobe and a second bore of a predetermined radius formed through said thickness dimension at a location displaced inwardly of the other end edge of said connecting rod means by a distance less than said predetermined radius to define an arcuate recess in said other end edge, said connecting rod means having a pair of arcuate grooves formed in opposed front and back surfaces of said single piece connecting rod, said arcuate grooves being concentric with said first generally circular bore;

(b) generally cylindrical wrist pin means for mounting in said connecting rod, having integrally formed annular flanges on opposed end surfaces thereof, the portion between the annular flanges being of an outside diameter slightly less than two times said predetermined radius and a flattened lateral surface such that said wrist pin is insertable in and rotatably held in said second bore;

(c) first and second retainer rings of an inside and outside diameter and thickness such that they fit within said arcuate grooves, the flanges on said opposed end surfaces of said wrist pin partially overlapping said retaining rings when said retaining rings are disposed in said arcuate grooves and said wrist pin is disposed in said second bore; and (d) means for securing said push rod to said flattened lateral surface of said wrist pin.

8. Apparatus as set forth in claim 7 wherein the region between said annular flanges of said wrist pin includes first and second annular grooves adjacent to said opposed end flanges, such that said retainer rings are further contained by said first and second annular grooves of said central region.

* * * * *